United States Patent [19]

Renaud

[11] Patent Number: 4,579,211
[45] Date of Patent: Apr. 1, 1986

[54] AUTOMOTIVE CLUTCH RELEASE BEARING

[75] Inventor: Pierre Renaud, Le Plessis Trevise, France

[73] Assignee: Valeo, Paris, France

[21] Appl. No.: 530,041

[22] Filed: Sep. 7, 1983

[30] Foreign Application Priority Data

Sep. 16, 1982 [FR] France .............................. 82 15651

[51] Int. Cl.$^4$ .............................................. F16D 19/00
[52] U.S. Cl. .................................. 192/98; 192/110 B; 192/113 R; 384/592
[58] Field of Search .................. 192/98, 110 B, 113 R; 384/592

[56] References Cited

U.S. PATENT DOCUMENTS

| | | | |
|---|---|---|---|
| 2,086,787 | 7/1937 | Whitely | 308/171 |
| 3,191,735 | 6/1965 | Wavak | 192/110 B |
| 4,117,916 | 10/1978 | Baker | 192/98 |
| 4,261,625 | 4/1981 | Renaud | 308/4 |

FOREIGN PATENT DOCUMENTS

| | | |
|---|---|---|
| 2145977 | 2/1973 | France . |
| 2230235 | 12/1974 | France . |
| 2317551 | 2/1977 | France . |
| 2070717 | 3/1980 | United Kingdom . |
| 2044385 | 10/1980 | United Kingdom . |

*Primary Examiner*—Ronald C. Capossela
*Attorney, Agent, or Firm*—Charles E. Brown; Charles A. Brown

[57] ABSTRACT

A clutch release bearing comprises an operating member cooperating with a throw-out fork and a drive member coacting with the release members of an associated clutch. The operating member comprises a sleeve mounted on a guide member and having relatively rigid projections running along the bore of the sleeve for sliding engagement with the guide member. Channels for accommodating solid grease are provided between the projections and are open at one end of the sleeve.

7 Claims, 4 Drawing Figures

AUTOMOTIVE CLUTCH RELEASE BEARING

BACKGROUND OF THE INVENTION

The present invention relates generally to clutch release bearings, also known as throw-out bearings, of the type particularly adapted for use with automotive clutches.

Such a clutch release bearing generally comprises a drive or thrust member which is adapted to coact with the release members of a clutch, in particular the fingers of the diaphragm spring in the case of a diaphragm friction clutch, an operating member whch is adapted to cooperate with an actuating member, in practice, a throw-out fork, and means for securing the drive or thrust member axially to the operating member.

The present invention relates more particularly to such clutch release bearings wcih are intended to be slidably received on a guide member which in the case of an automotive vehicle is a guide tube surrounding the input shaft of the transmission and fixed to the housing of the transmission. In such a case the operating member comprises a sleeve which is adapted to be entirely axially received on such a guide tube.

In the course of service the guide member inevitably accumulates dust, dirt and grit. The gradual buildup of such dirt may interfere with the proper sliding of the clutch release bearing necessary for operation and may even bind on the guide member.

In the case of a so-called self-centering release bearing, which maintains its self-centered position once it is obtained, the drive member is mounted for limited transverse movement in all directions with respect to the operating member, the sleeve of the operating member must be received with a relatively close fit on the guide member.

In my U.S. Pat. No. 4,261,625, assigned to the assignee of the present application, there is provided for meeting the apparently contradictory requirements of smooth sliding movement and a close fit a sleeve having along its inner surface radially inward projections or bosses adapted to slidingly engage the guide member and defining between one another channels or passages. In practice such projections or bosses are axially elongate splines and the passages or channels are axially elongate grooves therebetween.

Taking advantage of the self-lubricating properties of at least some plastic synthetic materials and the reduction of the frictional contact surface resulting from the splines, it was proposed in my aforementioned U.S. patent to provide dry contact, without any lubricant, between the sleeve of the clutch release bearing and the guide member on which it is received. The ends of the splines are axially outwardly tapering for channelling the dirt present on the guide member into the grooves thereby avoiding any undesirable contact between the sliding surfaces of the bosses or projections and the dirt or grit.

In practice such an arrangement has given satisfaction and its has the advantage of providing accurate location of the clutch release bearing with respect to the guide member, the splines on the sleeve of the operating member having the desired geometrical configuration for this purpose. Indeed, the dummy splines formed on the core of the mold for molding such an operating member may be subsequently individually trued.

For some applications, however, it is imperative to provide a grease reservoir between the clutch release bearing and the associated guide member.

Various arrangements have been proposed for this purpose. For example, in French patent publication No. 2,145,977 the sleeve of the operating member is provided with two radially inwardly resiliently deformable rings disposed at the respective ends of the axial bore in specially designed grooves in the inner surface of the bore, the rings having ridges engaging the guide member and defining the sought after grease reservoir or chamber therebetween. Owing to the resilient clamping action exerted by the rings the latter are detrimental to good sliding movement of the release bearing on the guide member. Further, such an arrangement necessitates the machining of annular grooves in the inner wall of the bore through the sleeve, and their mounting in the grooves is a rather delicate operation. Moreover, such an arrangement is not satisfactory in operation since the ridge profile of the rings may cram dirt and grit from the guide member.

In French patent publication No. 2,230,235 the sleeve of the operating member is made of flexible material and comprises at its axial ends annular beads which are in resilient engagement with the associated guide member and define, as above, a grease reservoir chamber between each other. But as in the preceding French patent publication owing to the elastic gripping of the guide member the annular beads tend to interfere with good sliding movement of the clutch release bearing on the guide member. In fact, given the actual flexible nature of the bead material, the beads are not suitable for scraping off any dirt or grit which may be present on the guide member.

In French patent publication, the provision of the sought after grease chamber translates into an uncertain location of the operating member with respect to the guide member, the elastic beads of the operating member sleeve enable skewing of the operating member relative to the axis of the guide member.

Admittedly, such skewing may be beneficial in the case of non-self-centering release bearings which is precisely the reason it is provided on the release bearing of French patent publication No. 2,230,235. But for the reasons developed above such skewing is normally not appropriate for sustained self-centering release bearings which maintain their self-centered position once it is attained.

Indeed, for ensuring the satisfactory position of the release bearing on the guide member, it is desirable to provide on the operating member relatively rigid projections or in other words an internal sheath or portion which is made of relatively rigid material.

It may be contemplated for the sought after grease chamber to provide on the inner surface of the bore of the sleeve of such relatively rigid material a recess closed at its axial ends such as is the rule for such grease chambers as exemplified by French patent publications Nos. 2,145,977 and 2,230,235. But when such a sleeve is of molded plastic synthetic material which contributes to good sliding on the guide member the formation of such a recess gives rise to difficulties which in practice are insurmountable.

Indeed, owing to the sleeve being of relatively rigid material it is impossible to unmold the sleeve elastically. Unmolding therefore would require the utilization of radially retractable cores making the cost of molding prohibitive.

OBJECT AND SUMMARY OF THE INVENTION

A general object of the invention is to provide a clutch release bearing which enables the foregoing drawbacks of the prior art to be overcome in a particularly simple and satisfactory manner.

According to the invention there is provided such a clutch release bearing comprising an operating member adapted to cooperate with an actuating member such as a throw-out fork and having a sleeve adapted to slide along a guide member, the sleeve having relatively rigid radial projections on its inner surface for sliding contact with the guide member, channels defined between the projections, the channels being axially open at one axial end of the sleeve and axially closed at the other axial end thereof.

The clutch release bearing, as is conventional, further comprises a drive member which is adapted to coact with the release members of the clutch, the closed ends of the channels being relatively axially adjacent the driven member. The projections are preferably axially elongate splines, the closed ends of channels being defined by an annular rib radially flush with the projections.

Thus, according to the invention the splines of U.S. Pat. No. 4,261,625 are used for accommodating grease whereas the splines were, in that patent, on the contrary, designed for accommodating dirt and grit picked up on the guide member.

The grease chambers of the present invention are defined by axial grooves between axial splines which are closed at one of their axial ends.

The present invention is based on the surprising finding that contrary to generally accepted notions, it is not necessary for such grease chambers to be closed at both axial ends, but may be closed at only one axial end.

Indeed, the grease used is virtually solid up to temperatures of the order of 80°-100° C., and it retains without any substantial deformation its splinelike configuration, complementary to the splines of the operating member and it protrudes radially toward the guide member when the release member is mounted on the latter.

Further, because of the gradual movement of the release bearing along the guide member away from the clutch as the friction facings of the driven disc become worn, there is a systematic cramming or tamping of the grease-filled grooves which causes a minimal amount of the grease to be driven or flow out into the interstitial between the projections on the sleeve of the operating member and the guide member, which space is necessary for mounting the operating member on the guide member.

The present invention resolves the dual problem of unmolding the operating member sleeve when made of relatively rigid material or of material made relatively rigid and providing a grease chamber on a sustained self-centering release bearing and accurate location of the operating member with respect to the guide member. Indeed, since the channels defining the grease chambers are opened at one of the axial ends, the unmolding of the sleeve of the operating member causes no particular difficulties. Further, aside from the inevitable play necessary for mounting of the operating member on the guide member, the splines stringently determine the position of the operating member on the guide member and, in addition, ensure good sliding of the operating member on the guide member.

BRIEF DESCRIPTION OF THE DRAWINGS

The features and advantages of the invention will be brought out in the description which follows, given by way of example, with reference to the accompanying schematic drawings.

DESCRIPTION OF THE PREFERRED EMBODIMENT

Figure 1:
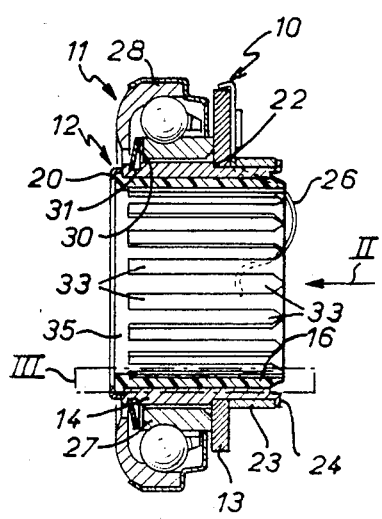
FIG. 1 is a longitudinal sectional view of a clutch release bearing embodying the present invention, taken along line I—I in FIG. 2.
Figure 2:
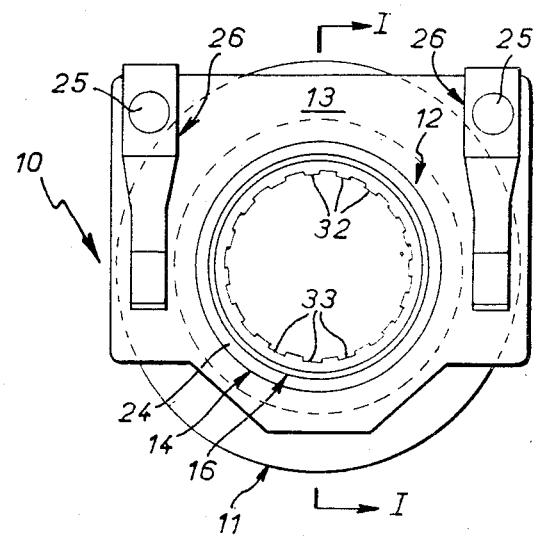
FIG. 2 is an elevational view taken in the direction of arrow II in FIG. 1.
Figure 3:
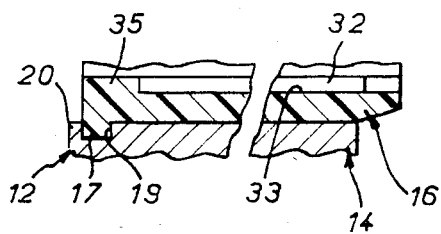
FIG. 3 shows an enlarged detail of the area enclosed by the box III in FIG. 1.
Figure 4:
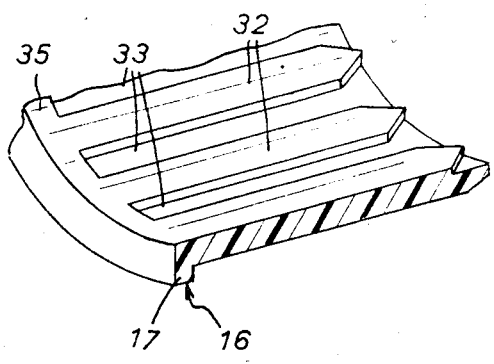
FIG. 4 is a partial perspective view, on a different scale, of the sleeve of the operating member of the clutch release bearing.

The drawings illustrate, by way of example, the application of the invention to a sustained self-centering release bearing.

As is known per se, the clutch release bearing generally comprises an operating member 10 which is adapted to cooperate with an actuating member which in practice is a throw-out fork, a drive or thrust member 11 which is adapted to coact with the release members of a clutch, e.g., the free ends of the radial fingers of the diaphragm spring in the case of a disphragm friction clutch, and means associated with axially acting resilient means for axially securing the drive member 10 to the operating member 10.

For the simplification of the drawings, neither the actuating member nor the release members of the clutch are illustrated.

The operating member 10 comprises a sleeve 12 which extends axially and which is adapted to slidingly engage a guide member and a transverse or radial flange 13 which is adapted to cooperate with the associated actuating member. Also for the sake of simplification the guide member on which the clutch release bearing is mounted is not illustrated.

In the illustrated embodiment the sleeve 12 of the operating member 10 comprises two coaxial components, i.e., an outer sleeve component 14 of metal and an inner sleeve component 16 of relatively rigid synthetic plastic material which is preferably glass fiber reinforced.

The inner sleeve component 16 has a radially outwardly extending collar 17 which is in mating engagement with a shoulder 19 of the outer sleeve component 14 and an inwardly projecting annular crimp 20 at the adjacent end of the outer sleeve component 14 bears against the corresponding end of the inner sleeve component 16 thereby fixing the axial position of the inner sleeve component 16 relative to the outer sleeve component 14.

The outer sleeve component 14 comprises an external annular shoulder 22 against which the flange 13 bears, the flange 13 being retained axially in position by a ring 23 which is received on outer sleeve component 14 and which is held by an inwardly projecting annular crimp 24 af the end of the outer sleeve component 14 remote from the crimp 20.

Two clips 26 for attaching the associated throw-out fork (not shown) are fixed to the flange 13 by rivets 25.

In the illustrated embodiment the drive or thrust member 11 simply comprises a ball bearing which is received with radial clearance on sleeve 12 of the operating member 10 to the side of flange 13 remote from clips 26. Only the inner race 27 of the ball bearing is in engagement through its corresponding endwall with the flange 13. The outer race 28 of the ball bearing of the drive member 11 is adapted to coact with the release members of the associated clutch (not shown) and has an inwardly rounded profile.

In the illustrated embodiment the means for securing the drive member 11 axially to the operating member includes axially acting or biasing resilient means. In practice, on the side of the drive member 11 remote from the flange 13 of operating member is disposed a Belleville type washer 30, the inner periphery of the Belleville washer 30 bears axially against one of the flanks of a radially outwardly opening groove 31 formed in the outer surface of the outer sleeve component 14, and the outer periphery of the Belleville washer bears axially against the endwall of the inner race 27 of the ball bearing defining the drive member 11.

The foregoing features are well known per se and as they do not constitute novel features of the present invention, they will not be described in greater detail herein.

Likewise, in a manner known per se, the sleeve 12 of the operating member 10 and more particularly, in the instant embodiment, the inner sleeve component 16 has integral longitudinally extending radial projections or bosses 32 which are adapted to slidingly engage the associated guide member (not shown) and which define between one another longitudinal channels 33. According to a feature of the present invention the channels 33 are axially open at one end of the sleeve 12 and closed at the other end of the sleeve.

In practice the axially closed ends of the channels 33 are located adjacent to the drive member 11. In the illustrated embodiment the projections 32 are axially elongate splines and the channels 33 are grooves closed by a circumferentially continuous annular rib 35. In practice the annular rib 35 lies radially flush with the projections 32 and extends to the corresponding free end of the sleeve 12. In other words the splines defining projections 32 and the annular rib 35 at one end thereof are in one piece and project from the inner surface of the inner sleeve component 16 of sleeve 12.

It will be readily understood that the inner sleeve component 16 may be easily molded, the central core necessary for forming the axial channels 33 may be withdrawn axially for unmolding the inner sleeve component 16.

Preferably, the free ends of the splines axially remote from the annular rib 35 are axially outwardly tapered to a point.

When the present clutch release bearing is mounted on the guide member the sleeve 12 of the operating member 10 is in good sliding contact therewith through its interior projections 32, with a small amount of radial clearance for the purposes of mounting.

The channels 33 are designed to form grooves between the splines for accommodating grease, which grease is solid at ordinary temperatures and projects radially as splines for engagement with the guide member. The resulting sliding contact is therefore with minimal friction.

Further, as will be noted, the grease in the channels is in direct communication with the ambient air only when the associated release bearing effects clutch disengagement.

The present clutch release bearing is not intended to be limited to the illustrated and described embodiment but rather encompasses all variations and alternatives understood to those skilled in the art without departing from the spirit and scope of the invention. In particular the sleeve and the flange of the operating member may be of one-piece synthetic plastic construction. Also, the field of the invention is not limited to sustained self-centering release bearings but includes all kinds of clutch release bearings.

What is claimed is:

1. A clutch release bearing for an automotive clutch, the release bearing comprising a drive member adapted to cooperate with the release members of an associated clutch and an operating member adapted to cooperate with an actuating member and having a sleeve adapted to be received on a guide member, the sleeve having along its inner bore circumferentially spaced, radial projections of relatively rigid material for sliding engagement with a guide member, channels being defined between said projections, said channels being axially open one end of said sleeve relatively axially remote from said drive member and closed at the other end of said sleeve relatively axially adjacent said drive member.

2. A clutch release bearing according to claim 1, wherein said projections comprise axially elongate splines, and said channels comprise axial grooves, a circumferentially continuous rib closing off the ends of all of said channels axially adjacent said drive member.

3. A clutch release bearing according to claim 2, wherein the radially inner surface of said annular rib is flush with that of said projections.

4. A clutch release bearing according to claim 2, wherein said annular rib effectively defines the said other end of said sleeve.

5. A clutch release bearing according to claim 1, said channels defining grease chambers for accommodating grease which is solid at normal operating temperatures of the clutch release bearing.

6. A clutch release bearing according to claim 1, wherein at least a part of said sleeve defining said projections and said channels is of integral molded plastic construction.

7. A clutch release bearing for an automotive clutch, the clutch release bearing comprising a drive member adapted to cooperate with release member of the clutch and an operating member adapted to cooperate with an actuating member and having a sleeve adapted to be received on a guide member, said sleeve defining an inner bore having radial projections of relatively rigid molded plastic material for sliding engagement with a guide member, channels being defined between said projections for accommodating radially inwardly projecting grease which is solid under normal operating temperatures of the clutch release bearing, said channels being closed at one end axially adjacent said drive member, said channels being axially open adjacent the other end of the sleeve, axially remote from said drive member, whereby in operation the solid grease is tamped and driven out of said channels into an interstitial space between said projections and the guide member.

* * * * *